No. 767,867. PATENTED AUG. 16, 1904.
J. N. BUSER.
PROTECTOR ATTACHMENT FOR HARVESTER BINDERS.
APPLICATION FILED MAR. 23, 1904.
NO MODEL.

Witnesses
R. A. Boswell
George M. Anderson

Inventor
Jacob N. Buser
By E. W. Anderson
his Attorney

No. 767,867.

Patented August 16, 1904.

UNITED STATES PATENT OFFICE.

JACOB N. BUSER, OF ANDERSON, INDIANA.

PROTECTOR ATTACHMENT FOR HARVESTER-BINDERS.

SPECIFICATION forming part of Letters Patent No. 767,867, dated August 16, 1904.

Application filed March 23, 1904. Serial No. 199,529. (No model.)

*To all whom it may concern:*

Be it known that I, JACOB N. BUSER, a citizen of the United States, and a resident of Anderson, in the county of Madison and State of Indiana, have made a certain new and useful Invention in Protector Attachments for Harvester-Binders; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1:
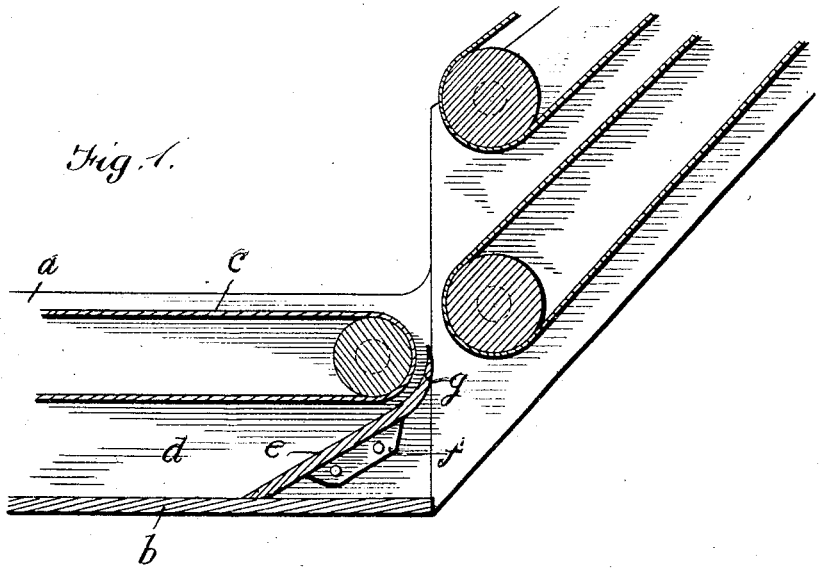
Figure 2:
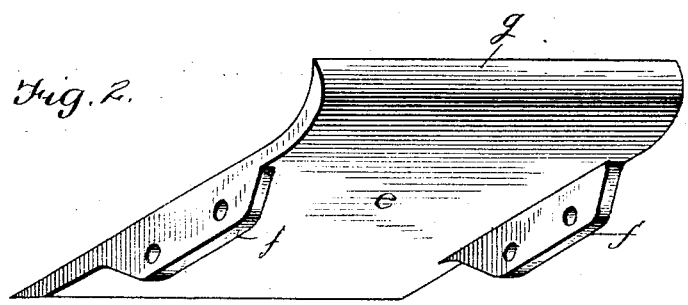

Figure 1 is a longitudinal sectional view showing my invention as applied. Fig. 2 is a detail perspective view of the invention.

The invention relates to means for protecting harvester-binders against cornstalks, weeds, and other extraneous matter; and it consists in the novel construction and combinations of parts, as hereinafter set forth.

In the accompanying drawings the letter $a$ designates the frame of the binder, having the bottom $b$, above which is the platform-carrier $c$. An interval $d$ below the carrier is liable to become clogged with weeds, cornstalks, &c., which not only choke the binder, but also injure the mechanism.

The attachment consists of the inclined board $e$, which is provided at its ends with flanges $f$ or other means of attachment to the side walls of the binder-frame. This protector-board $e$ has an inclination of about thirty degrees to the bottom $b$, from which it extends forward and upward, terminating a little forward of the carrier and above its lower portion. It effectually stops the passage of extraneous matter into the chamber below the carrier, and should any small piece of weed or other matter get into the narrow interval between the carrier and the protector as the protector has a sort of tangential position near the stubbleward roller of the carrier the motion of the latter upward and forward around the roller will eject such article over the lip $g$ of the protector.

Having described this invention, what I claim, and desire to secure by Letters Patent, is—

The combination with the binder-frame, and the platform-carrier, of the inclined protector-board joining the bottom of the binder-frame, having an upward relation to the stubbleward roller of the carrier, and terminating in an upturned lip at the end of the carrier, extending a little above its lower branch, substantially as specified.

In testimony whereof I affix my signature in presence of two witnesses.

JACOB N. BUSER.

Witnesses:
 JULIA A. MOORE,
 DE WITT C. CHIPMAN.